UNITED STATES PATENT OFFICE 2,256,588

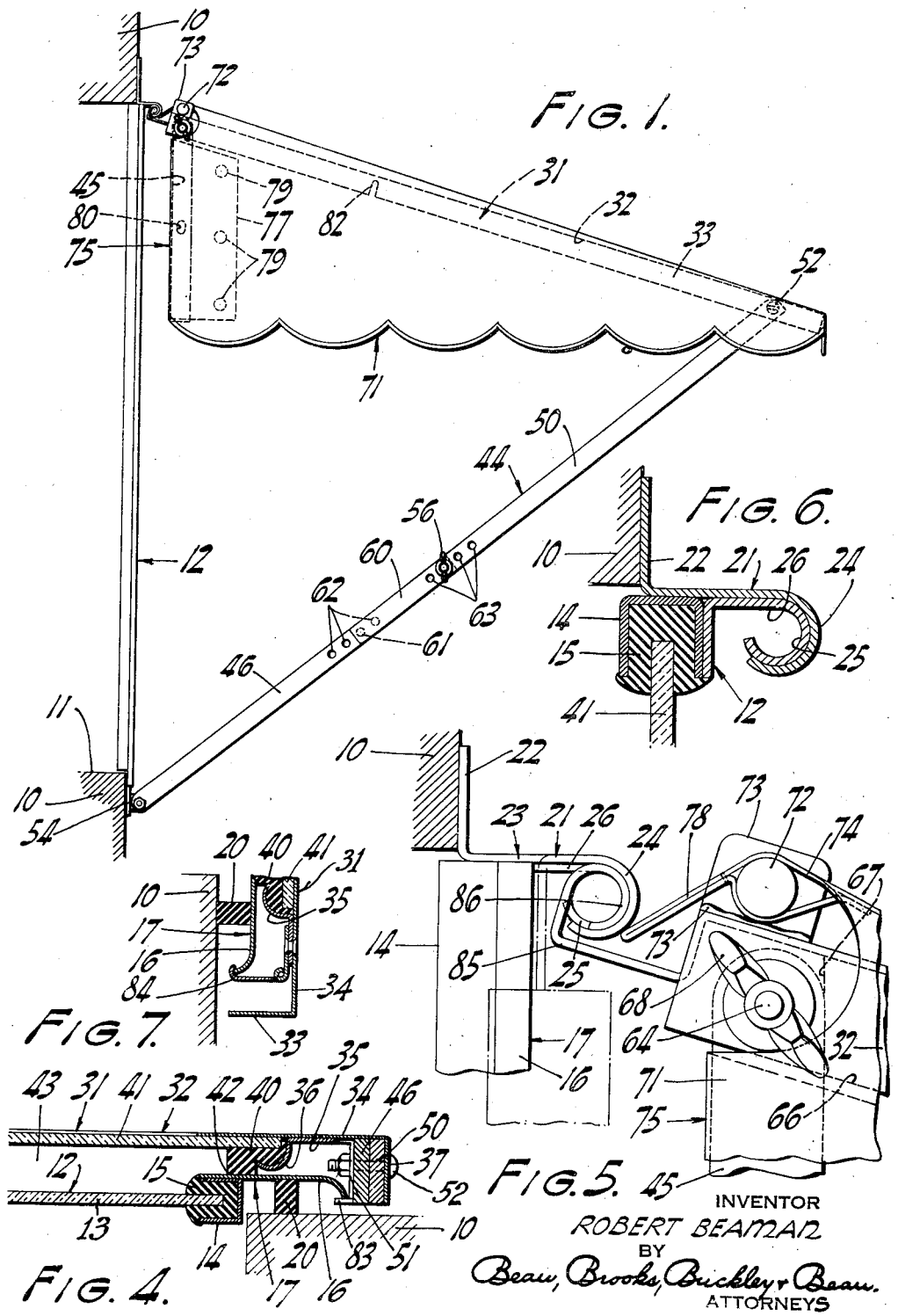

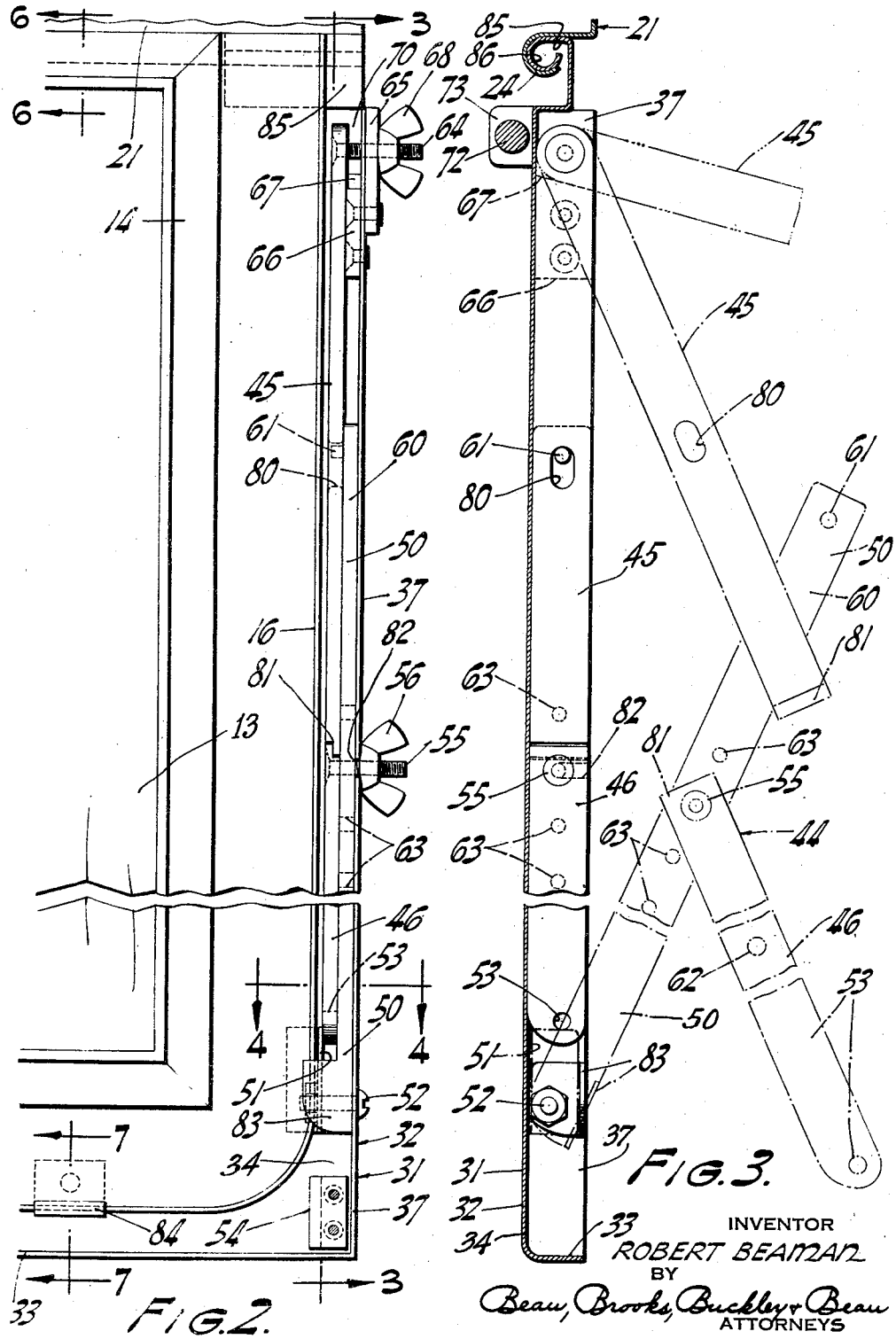

AUTOMOBILE TRAILER WINDOW

Robert Beaman, Lackawanna, N. Y., assignor of one-half to Burnwell Corporation, Buffalo, N. Y., a corporation of New York Application June 8, 1940, Serial No. 339,511

18 Claims. (Cl. 189—64)

It is well known to those skilled in the art that when trailers are used as living quarters for the winter, there is considerable condensation on the inner surfaces of the windows, owing to the moisture content of the air. This not only results in accumulation of frost which obscures the clear vision through the window but also is detrimental to the trailer walls when the moisture runs down over the surface of the walls and in between the veneering thereof. It is also well known that it is desirable in the summer to have awnings at the trailer windows.

The principal object of my invention has been to provide a storm window for auto trailer windows so designed that during one season of the year it will be lockingly engaged in interspaced relation with the regular window of the trailer, and thus be opened and closed therewith.

A further object has been to provide a pivotally mounted window so designed that it may be raised separately from the trailer window and held in projected position where it may act as a support for an awning.

Another object has been to provide a storm window for auto trailers which may be conveniently mounted upon the trailer without having to make alterations thereon.

Moreover, my invention is provided with a collapsible brace for holding the storm window in its elevated or open position, such brace being so designed that it may be nested in the sash of the storm window and held in an out-of-the-way position when not in use.

Furthermore, the brace is provided with means for locking the two windows together when it is in its nested position within the storm window frame.

The above objects and advantages have been accomplished by the device shown in the accompanying drawings, of which:

Fig. 1 is a side elevation showing my device attached to a trailer body and in its elevated, awning-supporting position.

Fig. 2 is a fragmentary, enlarged view of my invention when in its closed position and as viewed from the inner faces of the windows.

Fig. 3 is a sectional view taken on line 3—3 of Fig. 2, looking in the direction of the arrow in that figure, and showing the parts of the brace of my device in their nested positions in full lines and showing, in dot-and-dash lines, some of the positions occupied by the parts when the brace is being opened up ready for use.

Fig. 4 shows a fragmentary, sectional, plan view taken on line 4—4 of Fig. 2.

Fig. 5 is an enlarged, fragmentary, sectional, transverse view showing the position of the storm window when used as an awning support.

Fig. 6 is a fragmentary, sectional view taken on line 6—6 of Fig. 2.

Fig. 7 is a fragmentary, sectional view taken on line 7—7 of Fig. 2.

In the drawings 10 represents the body of the trailer with which my invention is used and shows a window opening 11. Over this opening is disposed the regular window 12 of the trailer. This window 12 comprises a window pane 13 which is mounted within a trailer sash 17 consisting of a U-shaped window frame 14 and an outwardly extending flange member 16. The frame 14 carries suitable packing 15 which engages the window pane 13, serving to seal the same in weatherproof manner. The sash 17 is suitably sealed by means of a gasket 20 carried on the inside of the flange member 16 and contacting with the outer surface of the body 10 when the window is in its closed position, as shown in Fig. 4.

The window 12 of the trailer is pivotally attached to the body 10 by being mounted in the usual bearing bracket 21. This bracket extends across the upper horizontal edge of the window opening 11 and is provided with a vertically disposed attaching flange 22. A horizontal member 23 extends outwardly from the flange 22 and away from the outer face of the wall 10 and is provided at its extreme outer edge with a tubular rolled portion 24 which engages with a tubular rolled portion 25 carried by an outwardly extending flange 26 of the trailer sash 17.

The storm window of my invention is represented at 31 and comprises a sash 32 having a horizontal inturned peripheral flange 33 at the bottom thereof and inturned vertical peripheral flanges 37 at the sides thereof. These flanges extend from a flat face portion 34 formed on the sash and on the inner face of which is secured a gasket clip 35. This clip has a clamping portion 36 which engages with a gasket 40 for holding the window pane 41 in place in water-tight manner. The gasket 40 is preferably provided with a flange portion 42 which serves to engage the outer face of the flange member 16 of the trailer sash 17 and thus provide a sealed air space 43 between the two windows.

The sash 32 of the storm window is somewhat larger than the sash 17 of the trailer window, thus providing a space between the vertical outer edges of the flange member 16 of the trailer sash and the vertical flanges 37 of the storm sash. In each of these spaces there is mounted one of the braces 44 and one of the awning arms 45 of my device. Each of the braces 44 comprises an inner extension link 46 and an outer extension link 50. The outer end of the extension link 50 is pivotally carried by the sash 32 of the storm window 31 and is pivotally mounted upon a bolt 52 engaging the vertical flange 37 of the sash and an interspaced lug 51 carried by the face portion 34 of the sash. The free end of the inner extension link 46 is provided with an aperture 53 which is detachably connected by any suitable means to a bearing clip 54, shown in full lines in Fig. 2, which is permanently secured to the face of the body part 10 of the trailer and so positioned as to come opposite the recess formed in the corner of the window 31 by the flanges 33 and 37. The inner and outer extension links 46 and 50, respectively, are pivotally connected together near their engaging inner ends by means of a bolt 55 having a wing nut 56. The bolt passes through a suitable aperture formed in the inner extension link near the extreme inner end thereof and through any one of a number of apertures 63 formed in the outer extension link. The apertures 63 are spaced inwardly from the inner end of this link so that a locking end 60 is formed thereon. This locking end carries a fixed pin 61 which engages with one of a number of interspaced apertures 62 formed in the inner extension link 46. The apertures 62 are so spaced that the pin 61 will register with one of them no matter with which aperture 63 the bolt 55 is engaged, thereby providing means for lockingly engaging the links 46 and 50 of the brace 44 at various positions of adjustment.

The awning arm 45 is pivotally attached at its upper end to the upper end of the flange 37 of the window 31 by means of a bolt 64 which passes through a reinforcing lug 65 secured to the outside of the flange 37. A wing nut 68 is carried by this bolt. Arranged on the inside of the flange 37 and overlapping the lug 65 is a stop cleat 66. This stop cleat is substantially the same thickness as the thickness of the outer extension link 50 for reasons to be hereinafter described. The stop cleat 66 and the lug 65 are suitably secured in place by welding or by means of the rivets shown. By the provision of the stop cleat 66 a recess 70 is formed in which the upper pivotal end of the awning arm 45 is disposed when this arm is moved to its awning-holding position, as shown in Fig. 1, the surface 67 being so positioned that when the end of the awning arm is located as just above described, this surface will act as a stop for preventing counterclockwise rotation of the arm from the position shown in Fig. 1, in which position it is supporting the awning 71 of my device. This awning is stretched across the sash 32 of the window 31 and is held in its extended position by the window and the awning arms. A suitable hem 75 formed by a flap 77 having snap fasteners 79 is provided at each of the vertical edges of the awning for engagement with said awning arms. The awning is also attached to an awning rod 72 extending across the upper edge of the sash 32 and held in place by means of cleats 73 suitably secured to the window frame. The awning is provided with a suitable hem 74 along its upper edge through which the rod 72 is passed when it is desired to fasten the awning in place. The hem 74 is formed with a flap 78 which extends rearwardly to the tubular bearing 24, thereby covering the space between the rod and the upper edge of the frame of the storm sash.

When the extension links 46 and 50 of the brace are in their nested positions, as shown in Fig. 2, the inner extension link 46 is superimposed substantially against the outer extension link 50 and in this position the inner locking end 60 of the link part 50 overhangs the pivotal outer end of the link part 46, as clearly shown in Figs. 2 and 3. When the two superimposed link parts at each side of the sash 32 are moved upon the pivot pin 52 to their nested positions within the recesses formed between the side flanges 16 and 37 of the two window sashes 17 and 32, the awning arms 45 are also moved into this space. Each of the awning arms when in nested position will be superimposed over the inner locking end 60 of the outer extension link 50 and in this position it will be located on top of the stop cleat 66. The awning arm is provided with a slot 80 so located as to be registerable with the pin 61 carried by the link end 60 when the parts are being moved to their final positions, thus serving to tie the arm 45 and the link 50 together when nested. The extreme outer end of the awning arm is joined to the pivotal inner end of the link 46 by means of a rabbet joint 81, the joint being so arranged that the awning arm is held in place beneath the end of the extension link. When the link parts are pushed to their final nested positions, the pivot bolt 55 will be passed into a slot 82 formed in the edge of the flange 37, the depth of the slot being such as to permit the links to move downwardly substantially to a position of contact with the face portion 34 of the sash 32. When in such position, the wing nut 56 is tightened, which will cause all of the link parts to be securely held in place in their nested positions within the window 31. Obviously, the wing nut 68 is also tightened upon the pivot bolt 64, thus snugly holding the upper end of the awning arm in place.

The outer end of the outer extension link 50 which is pivotally attached to the flange 37 of the sash 32 is provided with a cam plate 83. This cam plate extends laterally away from the inner face of the link and over the flange 16 of the trailer sash 17, whereby when the link parts are moved to the position shown in Figs. 2 and 3, the trailer window will be securely held in place against and within the storm window 31. A plurality of pivotal clips 84 may be provided along the lower edge of the trailer sash for snugly holding the two window sashes together at a number of points along the lower free edge. These clips are suitably secured to and carried by the face portion 34 of the storm sash.

The storm window 31 is provided at each of its side edges with a bearing clip 85 which has a rolled tubular bearing 86 mounted upon the tubular rolled bearing portion 24 of the trailer.

When the parts are in their nested position shown in Figs. 2 and 3, the two window sashes will be held together as a unitary structure and in this position the trailer window may be opened for ventilation if desired and held in any convenient position by means of the window opener (not shown) usually provided upon trailer windows. When the storm window 31 is to be separated from the trailer window 12, the wing nuts 68 and 56 are loosened, whereupon the nested levers and arms are withdrawn from the engaging recesses and the pin 61 is released from the slot 80 of the awning arm. The inner extension link 46 is rotated upon the pivot bolt 55 substantially through 180° until one of the holes 62 formed therein is brought into registration and engagement with the pin 61 carried at the locking end 60 of the outer extension link 50, whereupon the wing nut 56 is tightened, thus rigidly holding the two link parts together. Of course, when the outer extension link 50 is moved upon its pivot 52, the cam plate 83 is moved away from the flange 16 of the trailer sash 17 which releases the storm window 31 from the trailer window 16. When pivotal clips 84 are provided, these of course must also be disengaged from the trailer window when the windows are to be separated. After the inner and outer extension links have been rigidly secured together in their extended positions, the outer end of the inner link is suitably secured to the bearing clip 54 carried by the trailer body.

When the storm window 31 is to be used as an awning support, the awning rod 72 is passed through the hem 74 of the awning, after which it is engaged with the cleats 73. The awning arms 45 are now moved to the position shown in Fig. 5, whereupon the wing nuts 68 are screwed down upon the bolts 64, thus securely holding the awning arms in the recesses 67 and against the surfaces 67 of the stop cleats 66. The hems 75 of the awning are now engaged with the arms through the medium of the snap fasteners 79. If the storm window of my invention is to be used as an awning support without separating it from the trailer window, the pivot clips 84 will be allowed to remain in their engaged positions, which will hold the sashes together after the cam plate 83 has been released by the unfolding of the brace links. When the two sashes are separated, they may each be operated independently of one another.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A double window for auto trailers, comprising a pivoted trailer window, a storm window arranged in nested relation with the trailer window and pivotally mounted adjacent the upper edge of said trailer window, foldable brace means pivotally carried by said storm window and attachable to said trailer for holding said storm window in its open position, an awning rod carried by said storm window, and awning arms carried by said storm window adjacent said rod, said brace means comprising inner and outer extension links, and locking means carried by said links and said arms, whereby they may be locked when folded in nested position within said storm window.

2. In an auto trailer, the combination with a pivotally mounted trailer window, of a storm window pivotally mounted adjacent the upper edge of said trailer window and in nested relation therewith, a foldable brace carried by said storm window and attachable to the trailer for supporting said storm window in its open position, and locking means integral with a link of said brace and located near the pivotal connection of said brace link with said storm window so as to be rotated with said link, said last mentioned means serving upon rotation of said link toward its folded position and independent of the movement of said windows to clamp the two windows together.

3. In an auto trailer, the combination with a pivotally mounted trailer window having a sash, a storm window pivotally mounted adjacent the upper edge of said trailer window, comprising a trailer sash, side edge flanges and a bottom edge flange formed on said trailer sash, said trailer sash being nested with said storm sash, a multi-part foldable brace pivotally carried by the side flanges of said storm sash, said brace when extended holding said storm sash in elevated position, and cam means carried by one part of said brace and serving upon rotation to lock said sashes together when the sashes and brace parts are in their nested and folded positions.

4. In an auto trailer, the combination with a pivotally mounted trailer window having a sash, a storm window pivotally mounted adjacent the upper edge of said trailer window, comprising a trailer sash, side edge flanges and a bottom edge flange formed on said trailer sash, said trailer sash being nested with said storm sash, a brace including an outer extension link pivotally attached to each of said side edge flanges near the lower end of the storm sash, an inner extension link pivotally attached at one end to the outer extension link near its inner end and foldable therewith to lie in superimposed position adjacent each of said edge flanges, and cam means carried by said brace and located near the pivotal connection, said last mentioned means serving upon rotation to lock said sashes together when said sashes and the links of said brace are in their nested and folded positions.

5. In an auto trailer, the combination with a pivotally mounted trailer window having a sash, of a storm window pivotally mounted adjacent the upper edge of said trailer window, comprising a trailer sash, side edge flanges and a bottom edge flange formed on said trailer sash, said trailer sash being nested within said storm sash, a brace including an outer extension link pivotally attached to each of said side edge flanges near the lower edge of said storm sash, an inner extension link pivotally attached at one end to the outer extension link and foldable therewith to lie in superimposed position adjacent each of the side edge flanges, said inner extension link being connected to said outer extension link at some distance from the inner end of the outer extension link so that portions of the links overlap each other when in extended alignment, and means carried by both extension links and engageable by relative lateral movement for holding the same in rigid extended position.

6. A double window for auto trailers, comprising a trailer window, a storm window pivotally mounted adjacent the upper edge of said trailer window and arranged in nested relation therewith, brace means pivotally carried by said storm window and attachable to said trailer for holding the storm window in open position, comprising foldable links, means for holding said links in folded position, and locking means integral with one of said links and rotatable therewith to locking positions, said last mentioned means serving upon rotation to clamp said windows together when in adjacent positions.

7. A double window for auto trailers, comprising a trailer window, a storm window pivotally mounted adjacent the upper edge of said trailer window and arranged in nested relation therewith, brace means pivotally carried by said storm window, said brace means comprising two separate pivotally connected brace parts foldable within said storm window, one of said parts being pivotally carried by said storm window, the other of said parts being reversible with respect to said first part and attachable to the trailer body when extended for holding said storm window in open position, fastening means carried by said brace parts for non-rotatably clamping them in extended position, and locking means carried by said first mentioned brace part and rotatable therewith for clamping said windows together in nested relation when said brace parts are folded.

8. A double window for auto trailers, comprising a trailer window, a storm window pivotally mounted adjacent the upper edge of said trailer window and arranged in interspaced relation therewith, brace means pivotally carried by said storm window, said brace means comprising two separate pivotally connected brace parts foldable within said storm window, one of said parts being pivotally carried by said storm window, the other of said parts being reversible with respect to said first part and attachable to the trailer body when extended for holding said storm window in open position, fastening means carried by said brace parts for non-rotatably clamping them in extended position, and means constituting a part of said fastening means for holding said brace parts within said storm window when folded.

9. A double window for auto trailers, comprising a trailer window, a storm window pivotally mounted adjacent the upper edge of said trailer window and arranged in interspaced relation therewith, brace means pivotally carried by said storm window, said brace means comprising two separate pivotally connected brace parts foldable within said storm window, one of said parts being pivotally carried by said storm window, the other of said parts being reversible with respect to said first part and attachable to the trailer body when extended for holding said storm window in open position, fastening means carried by said brace parts for non-rotatably clamping them in extended position, locking means carried by said first mentioned brace part for holding said windows in nested relation when said brace parts are folded, and means constituting a part of said fastening means for holding said brace parts within said storm window when folded.

10. A double window for auto trailers, comprising a pivotally mounted trailer window having a trailer sash formed with an outwardly extending flange member, a storm window pivotally mounted adjacent the trailer window and having a storm sash formed with a peripheral flange arranged at right angles to the plane of the window, sealing means arranged between the windows for keeping the same in interspaced relation with each other, the peripheral flange of said storm sash extending over and substantially encompassing the flange member of the trailer window, whereby said windows when adjacent are arranged in nested relation, brace means pivotally carried by said storm sash and attachable to the trailer for holding the same in open position, said brace means being foldable within the peripheral flange of said storm sash when not in use, and locking means integral with a link of said brace and located near the pivotal connection of said link, said last mentioned means upon rotation being engageable with said trailer sash to lock said sashes together when in nested relation.

11. A double window for auto trailers, comprising a pivotally mounted trailer window having a trailer sash formed with an outwardly extending flange member, a storm window pivotally mounted adjacent the trailer window and having a storm sash formed with a peripheral flange arranged at right angles to the plane of the window, sealing means arranged between the windows for keeping the same in interspaced relation with each other, the peripheral flange of said storm sash extending over and substantially encompassing the flange member of the trailer window, whereby said windows when adjacent are arranged in nested relation, brace means pivotally carried by said storm sash and attachable to the trailer for holding the same in open position, said brace means being foldable within the peripheral flange of said storm sash when not in use, locking means integral with a link of said brace and located near the pivotal connection of said link, said last mentioned means upon rotation being engageable with said trailer sash to lock said sashes together when in nested relation, and fastening means carried by said brace means for engagement with said peripheral flange to hold said locking means in locked position.

12. The combination with the pivotally mounted window of an auto trailer, of a storm window pivotally mounted adjacent the trailer window, brace means carried by said storm window and attachable to said trailer for holding the storm window in open extended position independent of said trailer window for ventilation and support of an awning, locking means integral with a link of said brace means and located near the pivotal connection of said link with said last mentioned means serving upon rotation to clamp the two windows together, pivotally mounted awning arms carried by said storm window adjacent the pivotal connection of said storm window for engagement with an awning supported by said storm window, said brace means being foldable within said storm window when detached from the trailer, each awning arm being movable to a position of overlapped relation with each of said brace means when folded, and holding means carried by said brace means and said awning arm and cooperating with said storm window for securing said brace means and said awning arm in such overlapped positions.

13. The combination with the pivotally mounted window of an auto trailer, of a storm window pivotally mounted adjacent the trailer window, brace means carried by said storm window and attachable to said trailer for holding the storm window in open extended position independent of said trailer window for ventilation and support of an awning, locking means integral with a link of said brace means and located near the pivotal connection of said link with said last mentioned means serving upon rotation to clamp the two windows together, pivotally mounted awning arms carried by said storm window for engagement with an awning supported by said storm window, stop means carried by said storm window for non-rotatably holding each awning arm in extended position, said brace means being foldable within said storm window when detached from the trailer, each awning arm being movable to a position of overlapped relation with each of said brace means when folded, and holding means carried by said brace means and said awning arm and cooperating with said storm window for securing said brace means and said awning arm in overlapped position.

14. The combination with a pivotally mounted auto trailer window, of a combined storm window and awning support, comprising a storm sash pivotally mounted adjacent the upper edge of the trailer window and having a right-angled peripheral flange at each side thereof, brace means pivotally carried by said storm sash for holding the storm window in open awning-supporting position, each comprising an outer extension link pivotally attached at one end to the peripheral flange of said storm sash near the free edge thereof, an inner extension link foldably connected to said outer link at one end and detachably secured to the trailer body at the other end, fastening means for locking said links in extended positions, awning arms pivotally carried by said storm sash near the pivotal side edge thereof for attachment to an awning being supported by said storm window, means for holding said arms in their extended positions, one pair of links and one of the awning arms being foldable in interengaging and superimposed positions within one of the peripheral flanges of said storm sash when said storm window is in its closed position, and means constituting a part of said fastening means for holding said links and arm in such folded positions.

15. The combination with a pivotally mounted auto trailer window, of a combined storm window and awning support, comprising a storm sash pivotally mounted adjacent the upper edge of the trailer window and having a right-angled peripheral flange at each side thereof, brace means pivotally carried by said storm sash for holding the storm window in open awning-supporting position, each comprising an outer extension link pivotally attached at one end to the peripheral flange of said storm sash near the free edge thereof, an inner extension link foldably connected to said outer link at one end and detachably secured to the trailer body at the other end, fastening means for locking said links in extended positions, awning arms pivotally carried by said storm sash near the pivotal side edge thereof for attachment to an awning being supported by said storm window, means for holding said arms in their extended positions, one pair of links and one of the awning arms being foldable in interengaging and superimposed positions within one of the peripheral flanges of said storm sash when said storm window is in its closed position, means constituting a part of said fastening means for holding said links and arm in such folded positions, and cam means carried by the outer extension link and located near its pivotal connection for engagement upon rotation with said trailer window for clamping said storm window to said trailer window.

16. The combination with a pivotally mounted auto trailer window, of a combined storm window and awning support, comprising a storm sash pivotally mounted adjacent the upper edge of the trailer window and having a right-angled peripheral flange at each side thereof, brace means pivotally carried by said storm sash for holding the storm window in open awning-supporting position, each comprising an outer extension link pivotally attached at one end to the peripheral flange of said storm sash near the free edge thereof, an inner extension link foldably connected to said outer link at one end and detachably secured to the trailer body at the other end, fastening means for locking said links in extended positions, awning arms pivotally carried by said storm sash near the pivotal side edge thereof for attachment to an awning being supported by said storm window, an awning rod carried by said storm window near its pivotal support for engagement with the upper edge of an awning, means for holding said arms in their extended positions, one pair of links and one of the awning arms being foldable in interengaging and superimposed positions within one of the peripheral flanges of said storm sash when said storm window is in its closed position, and means constituting a part of said fastening means for holding said links and arm in such folded positions.

17. The combination with a pivotally mounted auto trailer window, of a combined storm window and awning support, comprising a storm sash pivotally mounted adjacent the upper edge of the trailer window and having a right-angled peripheral flange at each side thereof, brace means pivotally carried by said storm sash for holding the storm window in open awning-supporting position, each comprising an outer extension link pivotally attached at one end to the peripheral flange of said storm sash near the free edge thereof, an inner extension link foldably connected to said outer link at one end and detachably secured to the trailer body at the other end, fastening means for locking said links in extended positions, awning arms pivotally carried by said storm sash near the pivotal side edge thereof for attachment to an awning being supported by said storm window, means for holding said arms in their extended positions, one pair of links and one of the awning arms being foldable in interengaging and superimposed positions within one of the peripheral flanges of said storm sash when said storm window is in its closed position, means for holding each awning arm in nested position consisting of a rabbet joint formed between the end of the awning arm and the adjacent end of the inner extension link, and single clamping means for holding said links and arm in folded positions.

18. The combination with a pivotally mounted auto trailer window, of a combined storm window and awning support, comprising a storm sash pivotally mounted adjacent the upper edge of the trailer window and having a right-angled peripheral flange at each side thereof, brace means pivotally carried by said storm sash for holding the storm window in open awning-supporting position, each comprising an outer extension link pivotally attached at one end to the peripheral flange of said storm sash near the free edge thereof, an inner extension link foldably connected to said outer link at one end and detachably secured to the trailer body at the other end, fastening means for locking said links in extended positions, awning arms pivotally carried by said storm sash near the pivotal side edge thereof for attachment to an awning being supported by said storm window, means for holding said arms in their extended positions, one pair of links and one of the awning arms being foldable in interengaging and superimposed positions within one of the peripheral flanges of said storm sash when said storm window is in its closed position, means for holding each awning arm in nested position consisting of a rabbet joint formed between the end of the awning arm and the adjacent end of the inner extension link, and a pin carried by the inner end of the outer link and engageable with a slot formed in the awning arm intermediate its ends, and single means for clamping each group of arms and links together in folded position.

ROBERT BEAMAN.

CERTIFICATE OF CORRECTION.

Patent No. 2,256,588. September 23, 1941.

ROBERT BEAMAN.

It is hereby certified that error appears in the printed specification of the above numbered patent requiring correction as follows: Page 3, first column, line 49, and second column, lines 60 and 73, claims 1, 6 and 7 respectively, before the word "nested" insert --interspaced--; and that the same may conform to the record of the case in the Patent Office.

Signed and sealed this 4th day of November, A. D. 1941.

(Seal)

Henry Van Arsdale,
Acting Commissioner of Patents.